(12) United States Patent
Muegge

(10) Patent No.: US 11,231,158 B2
(45) Date of Patent: Jan. 25, 2022

(54) ILLUMINATION APPARATUS FOR A VEHICLE WITH LIGHT SOURCES, GUIDE ELEMENTS AND OPTICAL SEPARATION FUNCTION

(71) Applicant: HELLA GMBH & CO. KGAA, Lippstadt (DE)

(72) Inventor: Martin Muegge, Geseke (DE)

(73) Assignee: Hella GmbH & Co. KGaA, Lippstadt (DE)

(*) Notice: Subject to any disclaimer, the term of this patent is extended or adjusted under 35 U.S.C. 154(b) by 0 days.

(21) Appl. No.: 17/021,713

(22) Filed: Sep. 15, 2020

(65) Prior Publication Data

US 2020/0408380 A1 Dec. 31, 2020

Related U.S. Application Data

(63) Continuation of application No. PCT/EP2019/053544, filed on Feb. 13, 2019.

(30) Foreign Application Priority Data

Mar. 15, 2018 (DE) .................... 10 2018 106 035.1

(51) Int. Cl.
*F21S 43/50* (2018.01)
*F21S 43/14* (2018.01)
(Continued)

(52) U.S. Cl.
CPC ............... *F21S 43/50* (2018.01); *F21S 43/14* (2018.01); *F21S 43/15* (2018.01); *F21S 43/26* (2018.01);
(Continued)

(58) Field of Classification Search
CPC ...... F21S 43/235; F21S 43/236; F21S 43/237; F21S 43/239; F21S 43/241; F21S 43/243;
(Continued)

(56) References Cited

U.S. PATENT DOCUMENTS

| 4,733,335 A | 3/1988 | Serizawa et al. |
| 6,152,590 A | 11/2000 | Fürst et al. |

(Continued)

FOREIGN PATENT DOCUMENTS

| DE | 27 48 947 A1 | 5/1979 |
| DE | 10 2009 023 916 A1 | 12/2010 |

(Continued)

*Primary Examiner* — Robert J May
(74) *Attorney, Agent, or Firm* — Muncy, Geissler, Olds & Lowe, P.C.

(57) ABSTRACT

A lighting device for vehicles with a plurality of light sources and with a plurality of light guide elements each assigned to each of the light sources, which are arranged in front of the light sources in the main emission direction, wherein the light guide elements are designed as micro light guide elements and that an optical separation is provided between neighboring micro light guide elements and/or in the main radiation direction behind the micro light guide (Continued)

elements so that a scattered light portion emitted by a first light source cannot be irradiated or emitted by a light guide element assigned to a second light source.

10 Claims, 6 Drawing Sheets

(51) Int. Cl.
*F21S 43/15* (2018.01)
*F21S 43/20* (2018.01)
*F21Y 113/10* (2016.01)
*F21Y 115/10* (2016.01)
*F21W 103/60* (2018.01)
*F21W 103/15* (2018.01)

(52) U.S. Cl.
CPC ..... *F21W 2103/15* (2018.01); *F21W 2103/60* (2018.01); *F21Y 2113/10* (2016.08); *F21Y 2115/10* (2016.08)

(58) Field of Classification Search
CPC ...... F21S 43/245; F21S 43/247; F21S 43/249; F21S 43/251; B60Q 1/2665; G02B 6/0013; G02B 6/0075
See application file for complete search history.

(56) References Cited

U.S. PATENT DOCUMENTS

| | | | |
|---|---|---|---|
| 10,139,543 B2* | 11/2018 | Carullo | G02B 6/0008 |
| 10,434,932 B2 | 10/2019 | Gocke et al. | |
| 10,780,819 B2* | 9/2020 | Hellin_Navarro | B60Q 1/2665 |
| 2008/0013329 A1 | 1/2008 | Takeda et al. | |
| 2013/0170203 A1 | 7/2013 | Cheng et al. | |
| 2013/0329440 A1 | 12/2013 | Tsutsumi et al. | |

FOREIGN PATENT DOCUMENTS

| | | |
|---|---|---|
| DE | 10 2014 110 599 A1 | 1/2016 |
| DE | 10 2015 220 911 A1 | 4/2017 |
| DE | 10 2015 224 305 A1 | 6/2017 |
| EP | 1 528 527 A1 | 5/2005 |
| EP | 2 677 232 A1 | 12/2013 |
| EP | 2 827 049 A2 | 1/2015 |
| TW | 201122708 A1 | 7/2011 |

\* cited by examiner

ILLUMINATION APPARATUS FOR A VEHICLE WITH LIGHT SOURCES, GUIDE ELEMENTS AND OPTICAL SEPARATION FUNCTION

This nonprovisional application is a continuation of International Application No. PCT/EP2019/053544, which was filed on Feb. 13, 2019, and which claims priority to German Patent Application No. 10 2018 106 035.1, which was filed in Germany on Mar. 15, 2018, and which are both herein incorporated by reference.

BACKGROUND OF THE INVENTION

Field of the Invention

The present invention relates to a lighting device for vehicles with a plurality of light sources and with a plurality of light guide elements each assigned to the light sources, which are arranged in the main emission direction in front of the light sources.

Description of the Background Art

A lighting device for vehicles is known from DE 10 2009 023 916 B4, which has a plurality of light sources and a plurality of light guide elements designed as lenses for generating a predetermined light distribution. A lens element is assigned to each of the light sources so that, for example, an elongated surface of an additional brake light is effectively illuminated. If, for example, an entrance area of a vehicle is to be illuminated, it is desirable not only to illuminate the specified entrance area, but also to change at least part of the entrance area in terms of color and/or brightness. In this way, vehicle manufacturer-dependent, brand-typical color and/or brightness graphics can be generated which, if necessary, also provide information about the vehicle state (closed or open state). For generating such "intelligent" luminous graphics, the known lighting device has the disadvantage of requiring a relatively large installation space.

A lighting device for vehicles is known from DE 10 2014 110 599 A1, which has a plurality of light sources and light guide elements for generating an adaptive high beam distribution. The light guide elements are combined in a primary optics unit and in a secondary optics unit. The primary optics unit has a plurality of microlenses as light guide elements, by means of which a homogenized intermediate image can be generated in a space-saving manner. In this way, only a homogeneous illumination range can be generated.

SUMMARY OF THE INVENTION

It is therefore an object of the present invention to provide a lighting device for vehicles such that, in a space-saving manner, a plurality of luminous graphics different with respect to brightness and/or color can be generated with a clear channel separation to avoid scattered light or stray light.

In an exemplary embodiment, the light guide elements are designed as micro light guide elements and that an optical separation is provided between adjacent micro light guide elements and/or in the main emission direction behind the micro light guide elements, so that a portion of the scattered light emitted by a first light source cannot be irradiated or emitted by a light guide element assigned to a second light source.

The lighting device can have a plurality of micro light guide elements, each of which is assigned a single light source. The relatively small-dimensioned micro light guide element/light source pairs enable a light distribution or luminous graphic of high resolution. By appropriately controlling the light sources, the luminous graphic can have predetermined areas of high and low brightness or of a first and second color. In this way, luminous graphics of a specific pattern can advantageously be generated in terms of area and/or time. The integration of optical separations between adjacent micro light guide elements ensures that no scattered light portion of a light from a first light source assigned to a first micro light guide element is emitted via an adjacent micro light guide element. A luminous graphic can thus advantageously be provided, for example, with a color pattern of high resolution and little blurring. The optical separations lead to a channeling of the light, wherein the micro light guide elements exclusively transform or emit the light from the light sources assigned to them. An undesired crossing or shining over of light from neighboring "light channels" can thus be safely avoided. The lighting device according to the invention thus enables true-to-color and sharp luminous graphics.

The micro light guide elements can be designed as microlens elements. Adjacent optical separations are arranged at a distance of between 0.1 mm and 3 mm. The microlens elements advantageously enable true-to-color and sharp light imaging or graphical projection, so that the lighting device can be arranged, for example, as an "intelligent" entrance light on the outside mirror or on a trim strip or on a vehicle sill to illuminate the entrance area of the vehicle or can be used as lighting optics for downstream optical elements.

The light sources can be designed such that light of different colors or light of a specific color is emitted. Since each light source is assigned to a single micro light guide element and the micro light guide elements are optically separated from one another, it is ensured that light of a predetermined brightness and/or color hits the respective micro light guide elements without scattered or extraneous light from the same light source being routed via the adjacent micro light guide element, rather like a side channel.

The light sources can be provided as RGB light sources, in particular RGB LEDs, in order to be able to set any color in the individual channels or across all channels, or to be able to realize animated gradients and color transitions.

The light sources can be arranged in a first area of extent and the optical separations in a second area of extent, wherein the first area of extent and the second area of extent are arranged offset parallel to one another. The light pairs, which each include a light source and a microlens element, thus enable a uniformly sharp image of the specified luminous graphic.

The optical separations can each be designed as separating webs that rise from a base surface of a separating web unit and in the assembly position each engage in recesses of a microlens unit which receives the microlenses. The base surface of the separating web unit lies flat against a base surface of the microlens unit. This advantageously ensures simple assembly, wherein a defined relative position between the lenses and light sources arranged in pairs can be achieved. The separating web unit or the separating webs are guided in the direction of the light source area of extent up to the level of the light emitting surface of the light source and, ideally, are guided to the plane of the printed circuit board.

The separating web unit can have an attachment element on a side facing away from the microlens carrier for fixing to a printed circuit board that carries the light sources. The openings formed between the separating webs can advantageously serve to accommodate the light sources.

The separating web carrier and the microlens unit can be produced by two-component injection molding from an opaque and a translucent component. In this way, a microlens arrangement provided with separating webs can advantageously be produced in a simple and rapid manner.

The separating web unit can be formed by a separate metal part that is produced, for example, by die casting. In this way, relatively small wall thicknesses of the optical separations can advantageously be achieved. On the front side, the separating web unit can be overmolded with a transparent plastic material to form the microlens elements, wherein the optical separating webs are overmolded tightly.

The optical separations can be formed from an opaque deep-drawn plastic material, which is overmolded by a translucent plastic material to form the microlens elements. The deep-drawn plastic material can be designed as a plastic film, for example.

The microlens elements can be formed of a separate injection-molded, transparent plastic material with recesses between adjacent microlens elements. By masking and overmolding or coating an opaque plastic material or by a coating on the rear side, the recesses can be filled or coated, thus creating optical separations.

The microlens elements can be designed as a transparent plastic injection-molded part with channel-shaped recesses into which separating webs made of a metal material are inserted and/or pressed.

Further scope of applicability of the present invention will become apparent from the detailed description given hereinafter. However, it should be understood that the detailed description and specific examples, while indicating preferred embodiments of the invention, are given by way of illustration only, since various changes, combinations and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
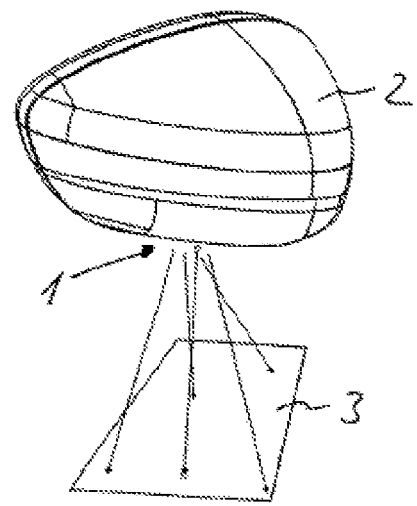
FIG. 1 is a perspective view of a lighting device integrated in an outside mirror of a vehicle for generating predetermined luminous graphics.

A lighting device according to the invention is preferably designed as an entrance light 1 which is integrated in an outside mirror 2 of a vehicle. The entrance light 1 is used to generate a luminous graphic 3, by means of which an area in front of a driver's door of the vehicle is illuminated. The entrance light 1 has a control which can be activated by the driver, for example, by means of a central remote control of the vehicle key.

Alternatively, the lighting device according to the invention can also be arranged in a trim strip along the doors of the vehicle or in lateral vehicle sills below the doors or in the area of a front and/or rear wheelhouse of the vehicle. Alternatively, the lighting device can be arranged in the interior of the vehicle to illuminate an illumination range in the interior, for example, to illuminate fixed, predetermined illumination ranges of the dashboard or the center console.

As a light source unit, the entrance light 1 comprises a plurality of light sources 4 which are arranged in an area of extent E1. The area of extent E1 is preferably flat. The light sources 4 are preferably designed as LED light sources. The light sources 4 can be arranged as chips on a common printed circuit board 5.

In the main emission direction H, a light guide unit is arranged in front of the light sources 4, which has a plurality of light guide elements designed as micro light guide elements 6 as well as optical separations 7 arranged between the micro light guide elements 6. The micro light guide elements 6 and the optical separations 7 are preferably firmly connected to one another and form a common structural unit. The micro light guide elements 6 extend in an area of extent E2, which is arranged offset in parallel with the area of extent E1 of the light sources 4. The area of extent E2 of the micro light guide elements 6 is preferably flat. The micro light guide elements 6 are arranged in the main emission direction H in front of the light sources 4. The micro light guide elements 6 are preferably made as microlens elements from a transparent and/or crystal clear material, for example a plastic material.

The optical separations are preferably designed as separating webs which are arranged in the main emission direction H behind the microlens elements 6 and/or between neighboring microlens elements 6. The optical separations 7 formed of an opaque, for example black, material, so that light hitting the same is predominantly and/or almost completely and/or completely absorbed.

Figure 2A:
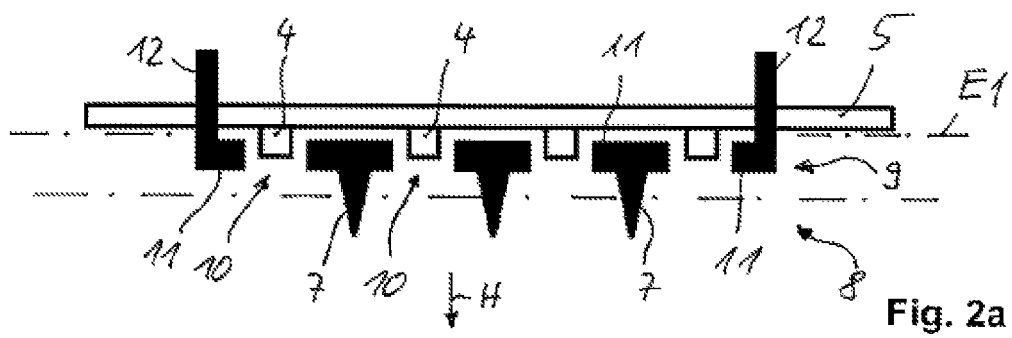
FIG. 2a is a first assembly step for producing a lighting device according to an exemplary embodiment, wherein a separating web unit is mounted on a printed circuit board.
Figure 2B:
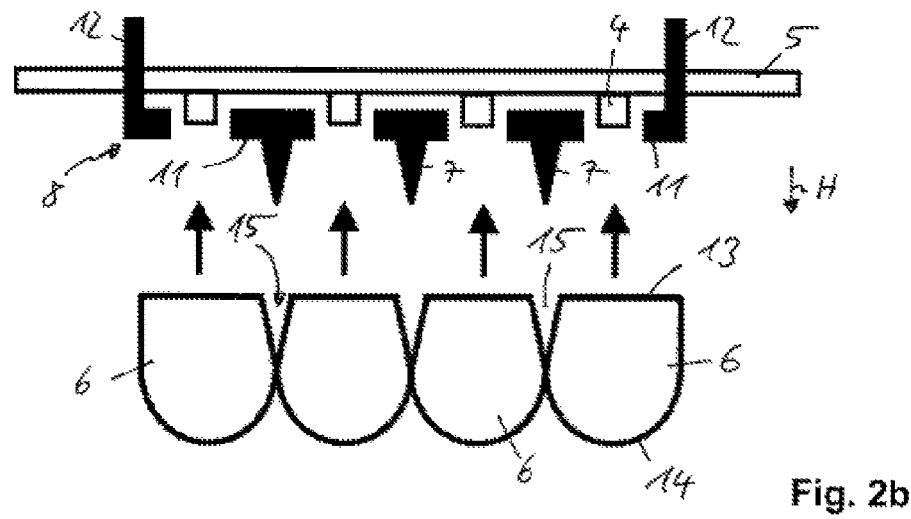
FIG. 2b is view of a further assembly step in which microlens elements are injected onto the separating web unit according to FIG. 2a, FIG. 2c is an assembly of a finished, overmolded printed circuit board—separating web unit—microlens unit.
Figure 2C:
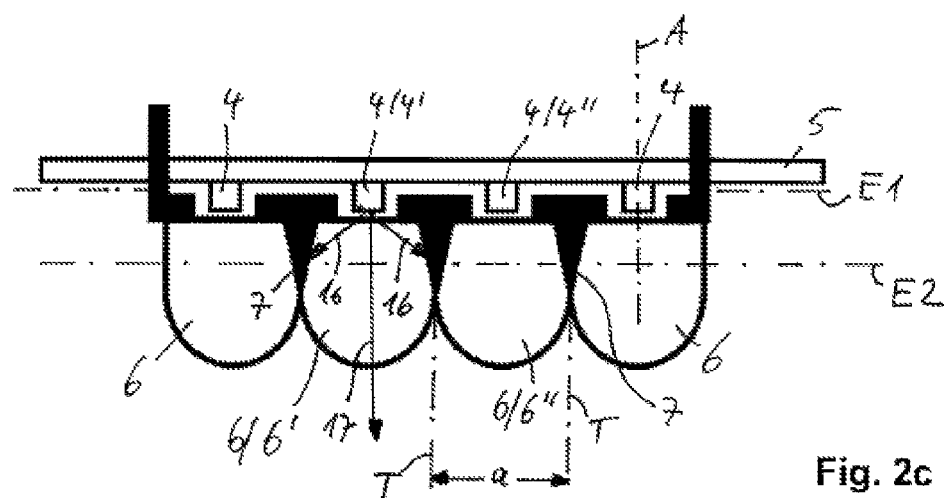

According to a first embodiment of the lighting device according to FIGS. 2a to 2c, the microlens elements 6 are produced separately from the optical separations 7. The optical separating webs 7 are integrated in a separating web unit 8, which are connected via a separating web carrier 9 and which has separating webs 7 protruding therefrom on a side facing away from the light sources 4. The separating web carrier 9 extends in a plane parallel to the area of extent E1 and has passages 10 which, in the assembly position, are each arranged in alignment with a light source 4. The light sources 4 can engage in the passage 10 of the separating web carrier 9. A base surface 11 of the separating web carrier 9 thus extends in a plane which intersects the light sources 4. On a side facing away from the separating webs 7, attachment elements 12 protrude from the base surface 11 of the separating web carrier 9, by means of which the separating web unit 8 can be fixed to the printed circuit board 5 of the lighting unit.

The separating web unit 8 is formed in one piece and can be produced, for example, by injection molding. Alternatively, the separating web unit 8 can also be formed of a metal material, in particular sheet metal material. For example, the separating web unit 8 can be designed as a die-cast component, by means of which relatively thin-walled separating webs 7 can be formed. In the present exemplary embodiment, the separating webs 7 are formed tapering towards a free end thereof.

After the separating web unit 8 has been produced and connected to the printed circuit board 5 having the light sources 4, the assembly thus formed is inserted in an injection molding tool and is overmolded or extrusion-coated with a transparent plastic or with an optical, transparent silicone material, wherein in each case microlens elements 6 associated with the light sources 4 are molded, see FIG. 2b and FIG. 2c. The microlens elements 6, which are preferably of identical design, preferably have a flat light entry surface 13 on a side facing the light sources 4 and an aspherical surface 14 on a side facing away from the light sources 4. The microlens elements 6 adhere to the flanks of the separating webs 7 and to a front side of the base surface 11 and are thus firmly connected to the separating web unit 8. The separating webs 7 extend into recesses 15 formed in a border area between two adjacent microlens elements 6, wherein the recesses 15 taper in the main emission direction H in accordance with the formation of the separating webs 7.

The separating webs 7 or the base surface 11 of the separating web carrier 9 ensure that a scattered light portion 16 of a light 17 emitted by a first light source 4' cannot enter a microlens element 6 assigned to an adjacent light source 4". Instead, this scattered light portion 16 is absorbed at the separating webs 7 or the base surface 11. The light from the first light source 4' only enters the microlens element 6' that is assigned to it and arranged in front of it. Only the light 17 emitted by the first light source 4' emerges from this microlens element 6'. The light 17 emitted by the second light source 4" only enters the microlens element 6" that is arranged in front of it. Only the light 17 emitted by the second light source 4" emerges from this microlens element 6". Undesired interfering or extraneous light 16 from adjacent light sources thus does not emerge from the respective microlens elements 6. This ensures that from the respective microlens elements 6 only the light 17 from the light sources 4 arranged directly behind them in the main emission direction H can emerge on the surface 14 of the microlens elements 6. Thus, only the light sources 4 assigned to the respective microlens elements 6 are imaged.

The light sources 4 or the microlens elements 6 can be arranged in a matrix-like manner in a number of rows and columns. Alternatively, the light sources 4 and the microlens elements 6 can also be formed in rows or elongated. The separating webs 7 each extend in a plane T which runs perpendicular to the printed circuit board 5 or parallel to an optical axis A of the light sources 4. A distance a between adjacent separating webs 7 or planes T thereof is in a range between 0.1 mm and 3 mm, preferably in the range between 0.1 mm and 2 mm, especially preferably in the range between 0.3 mm and 0.5 mm.

In the present exemplary embodiment according to FIGS. 2a to 2c, the light sources 4 are designed as single-color light-emitting light sources. For example, some of the light sources 4 can emit white light, while the other light sources 4 emit blue or green light or light of a further color. In addition, the light sources 4 can be dimmed so that they can radiate light of different brightness or light intensity. The light sources 4 are assigned a control with a predefined control scheme for generating the predefined luminous graphic 3 of the entrance light 1. For example, the luminous graphic 3 can be designed as a color graphic by means of which logos or other characters can be displayed. For this purpose, the luminous graphic 3 can have regions of different brightness and/or color in terms of location and/or time. In this way, for example, brand-typical distinction of the vehicle manufacturer can advantageously be achieved.

Alternatively, the light sources 4 can also be designed as RGB light sources (RGB-LEDs), which can each emit different light colors so that a free color setting or color animation is made possible.

The microlens unit 18 of the exemplary embodiments includes several microlenses 6.

The same components or component functions of the exemplary embodiments are provided with the same reference numbers.

Figure 3A:
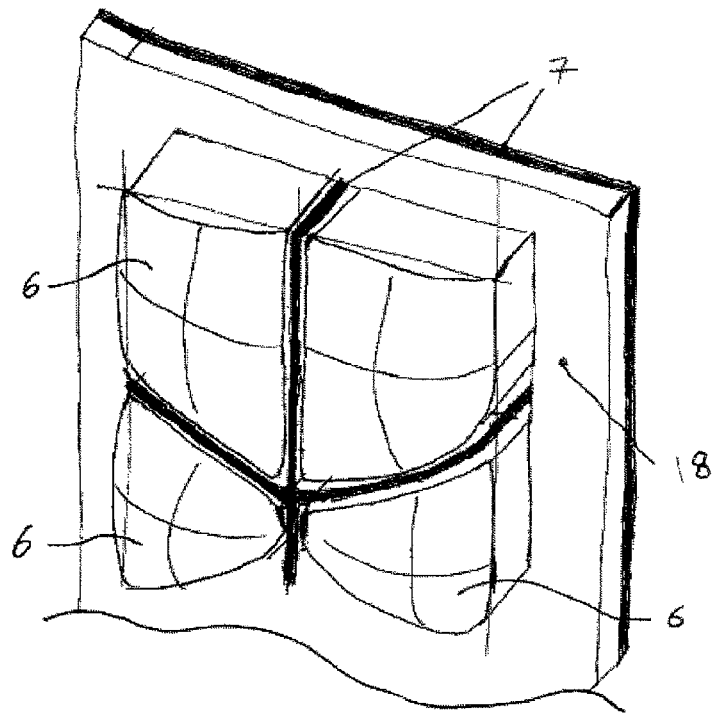
FIG. 3a is a front view of a segment of the lighting device with micro light guide elements arranged in the form of shards and optical separations according to an exemplary embodiment of the invention.
Figure 3B:
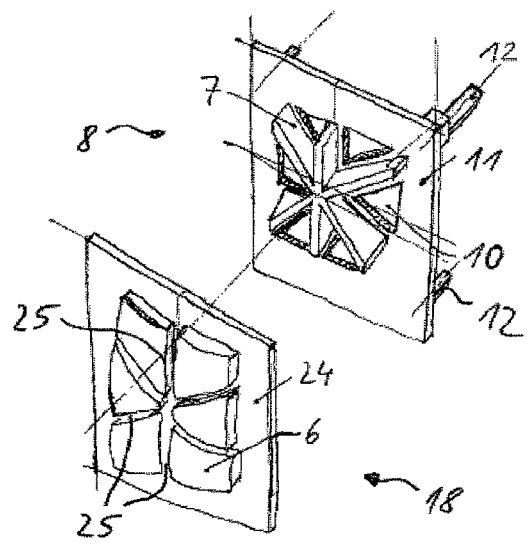
FIG. 3b is a schematic exploded view of two components of the lighting device according to FIG. 3a, FIG. 4a shows an exemplary embodiment of the invention in which a microlens component is created and is overmolded on the rear side with an opaque plastic material.

According to a further embodiment of the invention according to FIGS. 3a and 3b, the separating web unit 8 and the microlens unit 18 can also be produced by two-component injection molding from an opaque component for the separating web unit 8 and a transparent component for the microlens unit 18.

In a first injection molding step, the opaque plastic material is injected into a mold space of the injection molding device. In a second step, a transparent, crystal-clear plastic is injected over the already-formed separating web unit 8 and the microlens unit 18 is thus formed. The injection-molded component produced in this way is then fastened to the circuit board 5 via the attachment elements 12.

According to an alternative embodiment of the invention, not shown, the separating web unit 8 can be produced by deep drawing, wherein a plastic material deep-drawn in accordance with the shape of the separating web unit 8 is shaped from an opaque plastic material. For example, an opaque plastic film can be used for this purpose. The shaped film or the deep-drawn plastic material can then be inserted into an injection molding tool and be overmolded with the transparent plastic to form the microlens unit 18. Alternatively, the separating web unit 8 can also be produced as a separately injection-molded component that is then overmolded with the transparent plastic to form the microlens unit 18.

Figure 4A:
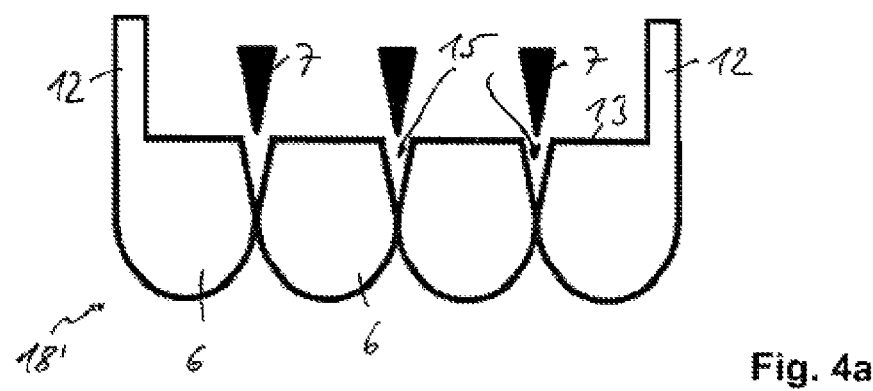
FIG. 4b is a view of the microlens component according to FIG. 4a in the finished, cast state of the separating elements.
Figure 4B:
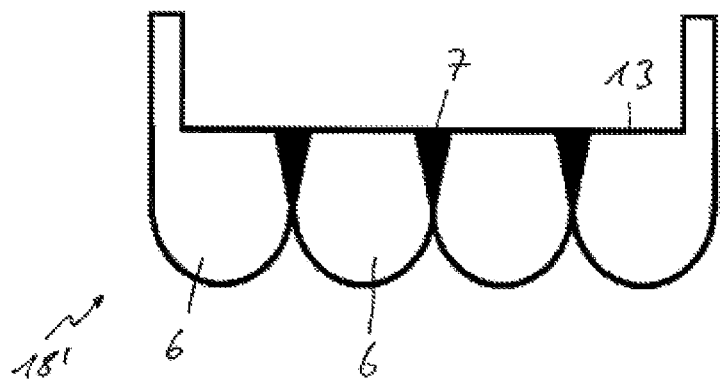

According to an exemplary embodiment of the invention according to FIGS. 4a and 4b, the microlens unit 18' is produced from a transparent plastic material by injection molding. In contrast to the aforementioned examples, the microlens unit 18' has the attachment elements 12 on its edge for fastening to the circuit board 5. In a further step, the microlens unit 18' is placed in a holding device and a liquid, opaque, for example black plastic material (PU plastic material) is poured over it. The opaque plastic material fills the recesses 15 of the microlens unit 18', joins with the transparent plastic of the microlens unit 18 and thus forms the opaque separating webs 7 between the microlens elements 6. For a flush connection of the separating webs 7 with the entry surface 13 of the microlens elements 6, protruding material can be worked off or ground off, for example by milling.

Figure 5A:
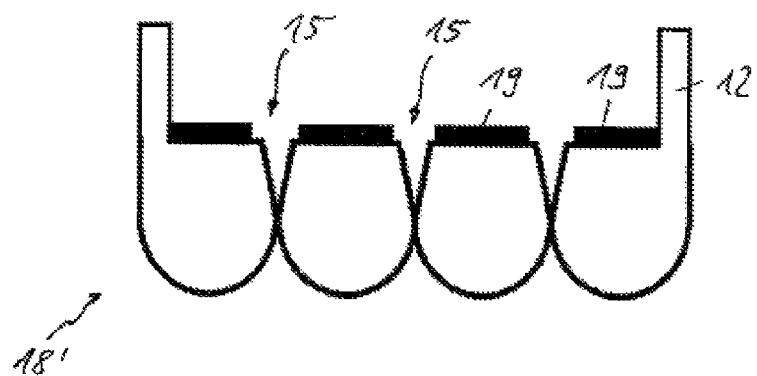
FIG. 5a is a lighting device according to an exemplary embodiment, in which a microlens component is provided with a coating template on the rear side.
Figure 5B:
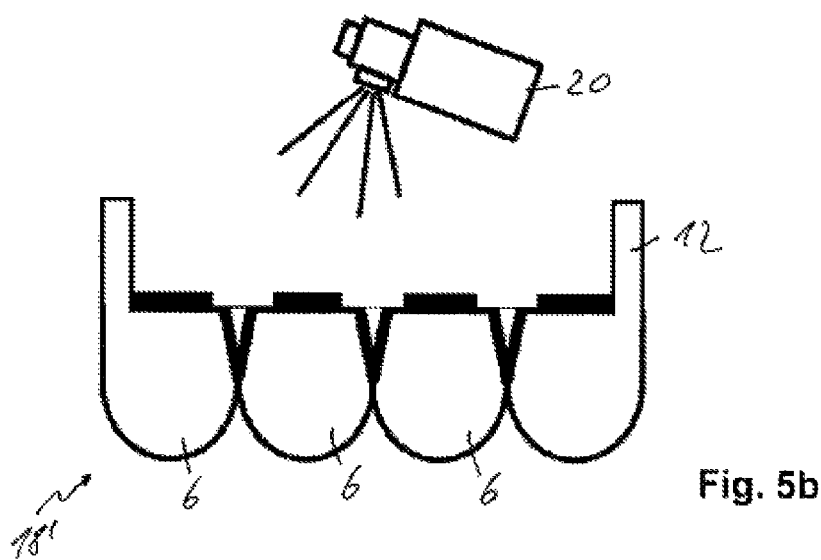
FIG. 5b is a view of the microlens component according to FIG. 5a during the application of the coating formed of opaque plastic material.
Figure 5C:
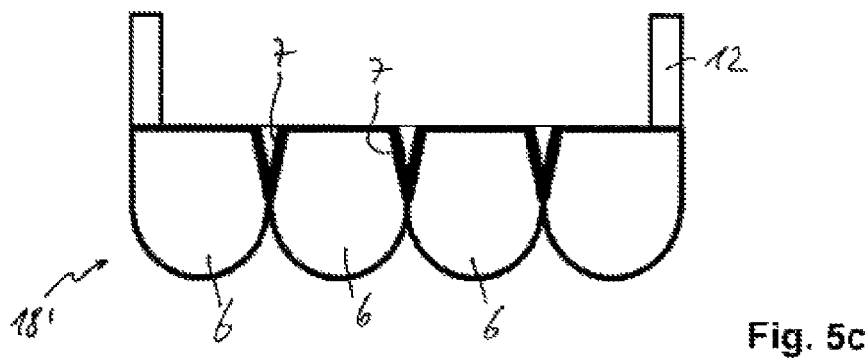
FIG. 5c is a view of the finished, coated microlens component.

According to an exemplary embodiment of the invention according to FIGS. 5a to 5c, the microlens unit 18' can be connected to the separating webs 7 by coating the latter. For this purpose, the microlens unit 18' inserted in a holding device is provided with a coating template 19, wherein the coating template 19 covers the predetermined entry surface 13 of the microlens elements 6. Only the recesses 15 remain clear. In a further step, the entry side of the microlens unit 18' is coated by means of a coating apparatus 20, with only one surface of the recesses 15 being provided with the coating. After removing the coating template 19, the coating forms the separating webs 7.

Figure 6A:
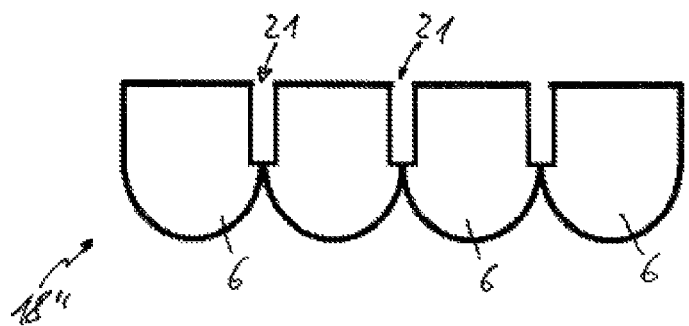
FIG. 6a is an exemplary embodiment of the lighting device with a microlens component containing channel-shaped recesses.
Figure 6B:
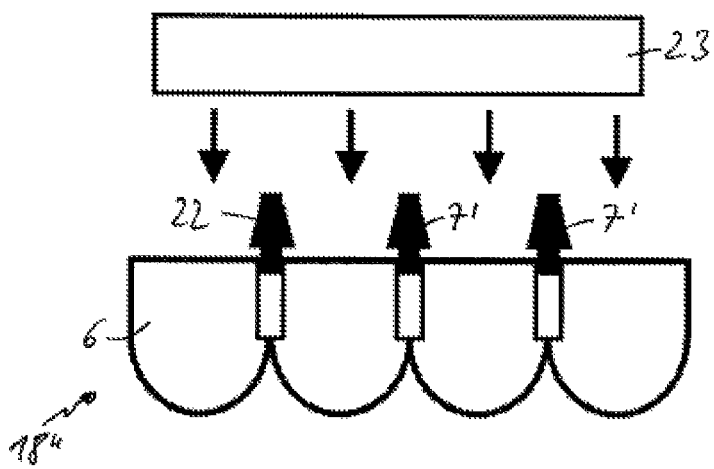
FIG. 6b is a view of the microlens component according to FIG. 6a during the mechanical introduction of separating webs made of a sheet metal material and FIG. 6c is a view of the finished microlens component with pressed-in separating webs.
Figure 6C:
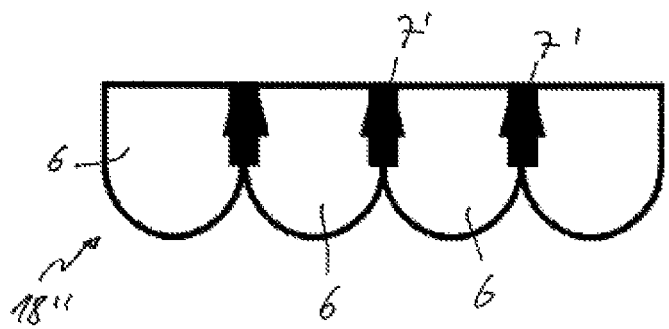

According to an exemplary embodiment of the invention according to FIGS. 6a to 6c, a microlens unit 18" can be produced from a transparent plastic material, for example by injection molding, wherein channel-shaped recesses 21 are formed between the microlens elements 6 on the inlet side. In a further step, individual separating webs 7' made of a metal material are inserted and/or pressed into the channel-shaped recesses 21. The separating webs 7' can be formed of a sheet metal material. They can be produced by laser cutting or punching. The separating webs 7' are preferably designed in the shape of barbs with a V-shaped head 22, so that they can hook inside the recess 21 in the assembly position. The separating webs 7' are pressed into the recess 21 of the microlens unit 18" by means of a pressing device 23.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting device for vehicles comprising:
   at least two light sources; and
   at least two guide elements respectively assigned to the at least two light sources, the at least two guide elements being arranged in a main emission direction in front of the at least two light sources,
   wherein the at least two light guide elements are each designed as micro light guide elements,
   wherein an optical separation is provided between adjacent micro light guide elements and/or is provided in the main emission direction behind the micro light guide elements so that a portion of scattered light emitted by a first one of the at least two light sources cannot be irradiated or emitted by a micro light guide element assigned to a second one of the at least two light sources,
   wherein the optical separations are formed of an opaque material,
   wherein each of the micro light guide elements are designed as a microlens element, wherein a microlens unit comprises the microlens elements, wherein the microlens unit is formed from an injection-molded transparent plastic material with recesses between adjacent microlens elements, and wherein the microlens unit is overmolded with an opaque plastic material on the back or the microlens unit is coated with a coating of opaque material to form the optical separations.

2. The lighting device according to claim 1, wherein adjacent optical separations are arranged at a distance between 0.1 mm and 3 mm.

3. The lighting device according to claim 1, wherein each of the at least two light sources emit light of different colors or emit light of a fixed, predetermined color, wherein corresponding to a predetermined color graphic to be projected, the at least two light sources are distributed over an area of extent and wherein a control for the at least two light sources is provided with a control scheme for the predetermined color graphic.

4. The lighting device according to claim 1, wherein the optical separations and the microlens elements are arranged in a matrix-like manner in a plane of extent that is parallel to an area of extent of the at least two light sources.

5. A lighting device for vehicles comprising:
   at least two light sources; and
   at least two guide elements respectively assigned to the at least two light sources, the at least two guide elements being arranged in a main emission direction in front of the at least two light sources,
   wherein the at least two light guide elements are each designed as micro light guide elements,
   wherein an optical separation is provided between adjacent micro light guide elements and/or is provided in the main emission direction behind the micro light guide elements so that a portion of scattered light emitted by a first one of the at least two light sources cannot be irradiated or emitted by a micro light guide element assigned to a second one of the at least two light sources,
   wherein each of the micro light guide elements are designed as a microlens element,
   wherein the optical separations are each designed as separating webs which extend from a base surface of a separating web unit and, in an assembly position, the optical separations engage in recesses or slots of a microlens unit comprising the microlens elements, and wherein the base surface of the separating web unit rests flat against a base surface of the microlens unit.

6. The lighting device according to claim 5, wherein the separating web unit, on a side facing away from the microlens unit, or the microlens unit on a side facing the at least two light sources, has an attachment element for fixing to a printed circuit board that carries the at least two light sources.

7. The lighting device according to claim 5, wherein the separating web unit and the microlens unit is formed by two-component injection molding from an opaque component for the separating web unit and a translucent component for the microlens unit.

8. The lighting device according to claim 5, wherein the separating web unit is designed as a separate metal part, wherein the separating webs taper towards a free end thereof, and wherein the separating web unit is overmolded by a transparent plastic material to form the microlens unit.

9. The lighting device according to claim 5, wherein the optical separations are formed from a deep-drawn plastic material or are created as a separately molded component and wherein the optical separations are overmolded by a transparent plastic material to form the microlens unit.

10. A lighting device for vehicles comprising:
at least two light sources; and
at least two guide elements respectively assigned to the at least two light sources, the at least two guide elements being arranged in a main emission direction in front of the at least two light sources,
wherein the at least two light guide elements are each designed as micro light guide elements,
wherein an optical separation is provided between adjacent micro light guide elements and/or is provided in the main emission direction behind the micro light guide elements so that a portion of scattered light emitted by a first one of the at least two light sources cannot be irradiated or emitted by a micro light guide element assigned to a second one of the at least two light sources,
wherein each of the micro light guide elements are designed as a microlens element,
wherein a microlens unit comprises the microlens elements and wherein the microlens unit is a transparent plastic injection-molded component with channel-shaped recesses into which the optical separations, which are made of metal material, are inserted and/or pressed in.

* * * * *